No. 886,784. PATENTED MAY 5, 1908.
B. VOM EIGEN.
COIN REPOSITORY.
APPLICATION FILED MAR. 30, 1907.

No. 886,784. PATENTED MAY 5, 1908.
B. VOM EIGEN.
COIN REPOSITORY.
APPLICATION FILED MAR. 30, 1907.

WITNESSES: INVENTOR:
Benno Vom Eigen
BY
Fraentzel and Richards,
ATTORNEYS.

No. 886,784. PATENTED MAY 5, 1908.
B. VOM EIGEN.
COIN REPOSITORY.
APPLICATION FILED MAR. 30, 1907.

WITNESSES:
F. H. W. Fraentzel
Frederick Jamison

INVENTOR:
Benno Vom Eigen
BY
Fraentzel and Richards,
ATTORNEYS.

No. 886,784.  
PATENTED MAY 5, 1908.  
B. VOM EIGEN.  
COIN REPOSITORY.  
APPLICATION FILED MAR. 30, 1907.  
6 SHEETS—SHEET 6.

WITNESSES:  
INVENTOR:  
Benno Vom Eigen  
BY Fraentzel and Richards  
ATTORNEYS.

UNITED STATES PATENT OFFICE.

BENNO VOM EIGEN, OF NEWARK, NEW JERSEY, ASSIGNOR TO AUG. GOERTZ & CO., A CORPORATION OF NEW JERSEY.

COIN-REPOSITORY.

No. 886,784.     Specification of Letters Patent.     Patented May 5, 1908.

Application filed March 30, 1907. Serial No. 365,588.

*To all whom it may concern:*

Be it known that I, BENNO VOM EIGEN, a citizen of the United States, residing at Newark, in the county of Essex and State of New Jersey, have invented certain new and useful Improvements in Coin-Repositories; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in that class of articles of manufacture pertaining to what is known in the art as pocket-banks; and the invention has reference, more particularly, to a novel bank which is adapted to be carried in the pocket and which is provided with a key-operated closing means or lock, which can only be operated by means of a key supposed to be in the possession of a person other than the person carrying the bank, as a banker, or the like, so that the possessor of the bank may deposit therein from time to time coins of the various denominations, which coins are to be removed only by the banker for deposit to the account of the person carrying the bank.

My present invention, therefore, has for its principal object to provide a neatly and simply constructed device of the general character hereinafter more fully set forth, in which the various parts of the mechanisms are arranged in their assembled relations without the use of rivets, or similar fastening means, the various parts all being struck-up by means of dies, or similar tools, without the necessity of further having to finish off the parts, and the various parts being quickly assembled and held in an interlocked or engaged relation, to produce a bank, the shell or casing of which is provided at one end or other suitable part, with a coin-receiving slot, and at the other end, or other suitable part, with a locking mechanism, which can only be opened by means of a key, to permit the end-portion of the shell or casing to be pulled out for a certain distance, for the removal of the coin, and when returned being again automatically locked and retained in its normally closed relation in the end or other portion of the shell or casing.

Other objects of this invention are to provide a novel means which is placed in close proximity to the coin-receiving slot, and is arranged and constructed in such a manner, that while it does not interfere with the insertion and the depositing of a coin or coins in the interior of the bank, still it is positively tamper-proof and can not be manipulated with the blade of a knife or other instrument for the removal of a coin or coins from the bank.

Other objects of this invention not at this time more particularly mentioned, will be clearly understood from the following detailed description of the same.

My present invention consists, primarily, in the novel pocket bank hereinafter set forth; and, furthermore, the invention consists in the various arrangements and combinations of devices and parts, as well as in the details of the construction of the same, all of which will be hereinafter more fully set forth, and then finally embodied in the clauses of the claims which are appended to and which form an essential part of this specification.

The invention is clearly illustrated in the accompanying drawings, in which:—

Similar characters of reference are employed in all of the above described views to indicate corresponding parts.

Referring now to the several figures of the drawings, the reference-character 1 indicates a complete pocket-bank, and 2 is a suitable key which is to be used in connection therewith. The said bank consists, essentially, of a pair of metal shells or sections 3 and 4, each shell being provided with the arc-shaped side or edge-portions 5, which are placed edge to edge, substantially in the manner illustrated in Figs. 11, 19, 20 and 21 of the drawings.

Figures 1, 2, 3, 4, 5:
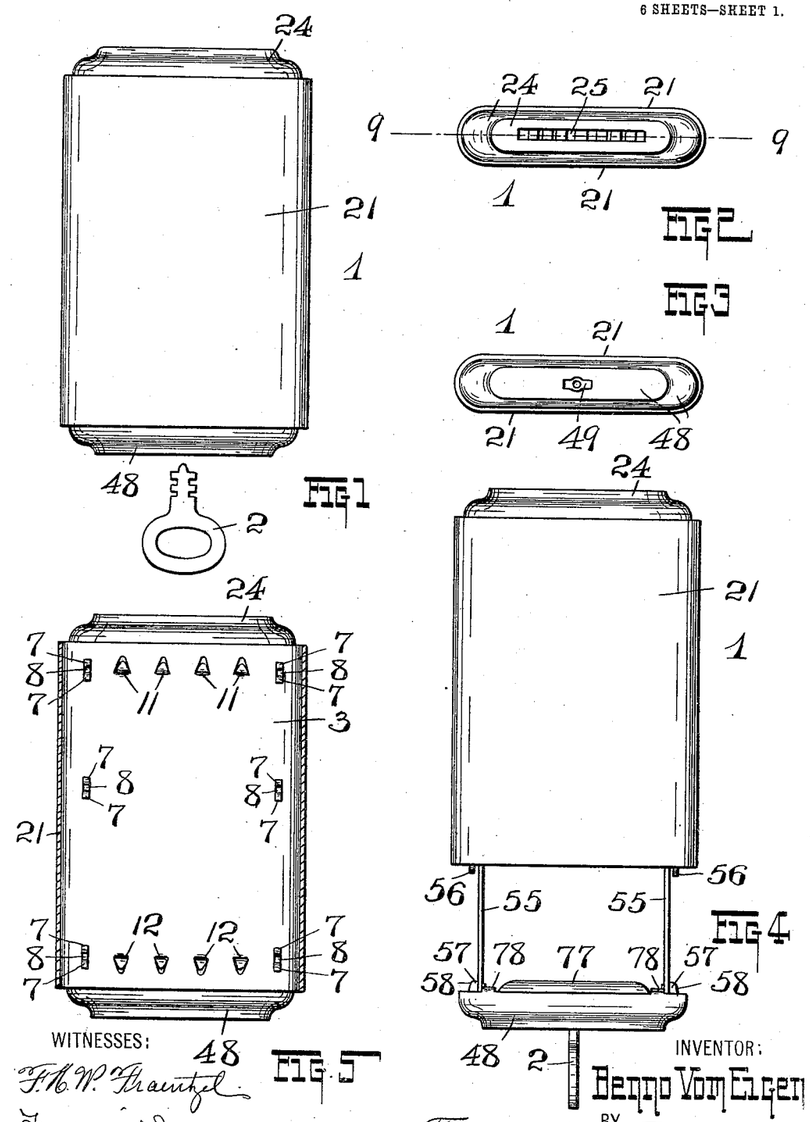
Figure 1 is a face view of a pocket-bank embodying the principles of the present invention, showing in connection therewith a key about to be inserted in the lock of the bank.
Figs. 2 and 3 are the respective end views of the same.
Fig. 4 is a view similar to that shown in Fig. 1, but illustrating the closing or locking device or attachment at the one end of the bank, with the key inserted, drawn out to permit of the removal of the coin or coins from the interior of the shell or casing of the bank.
Fig. 5 is a view similar to that shown in Fig. 1, but representing the leather or other suitable covering which surrounds the shell or casing of the bank in vertical section.
Figures 6, 7:
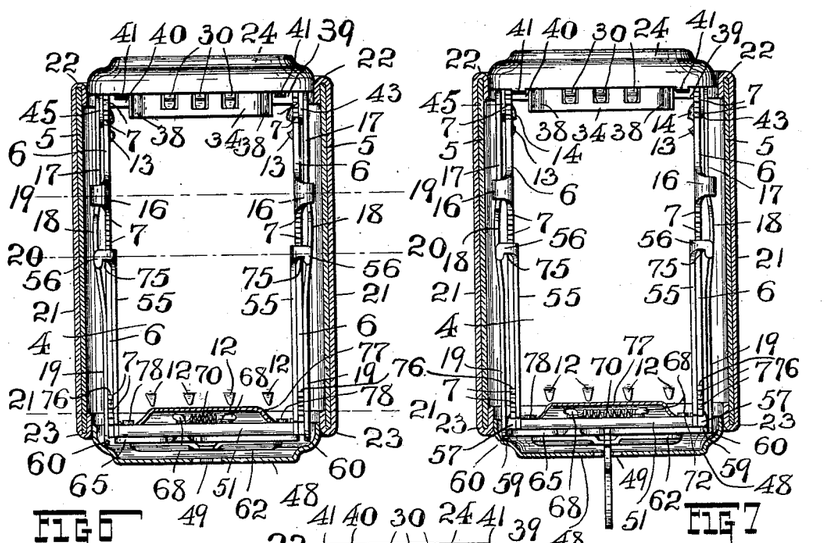
Fig. 6 is a longitudinal vertical section of the shell or casing of the bank, and its envelop or covering, with the various interiorly arranged mechanisms shown in elevation, the various parts being represented in their normally locked relation.
Fig. 7 is a similar representation of the same parts, but illustrating the mechanism of the lock in its key-actuated relation, having disengaged the remaining holding devices for the removal of the end-closing device of the shell or casing, the said device being shown in its relative position just prior to its withdrawal from within the end of the casing or shell.
Figure 8:
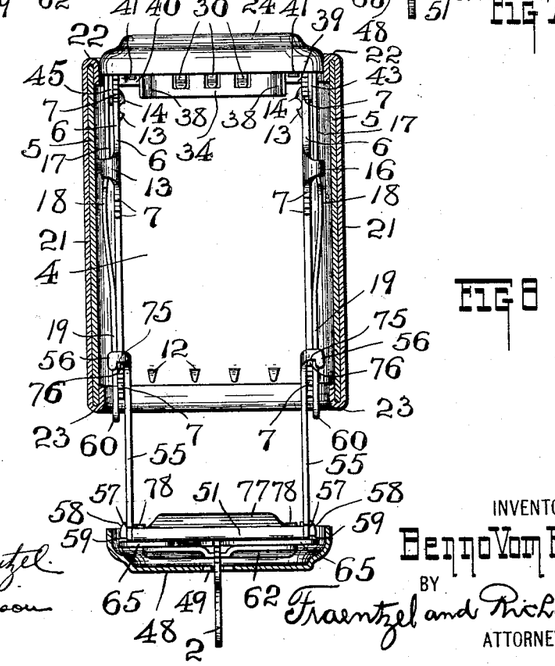
Fig. 8 is a similar view of the same devices and parts, showing the end closing device withdrawn from within the end of the shell or casing.
Figures 9, 10, 11:
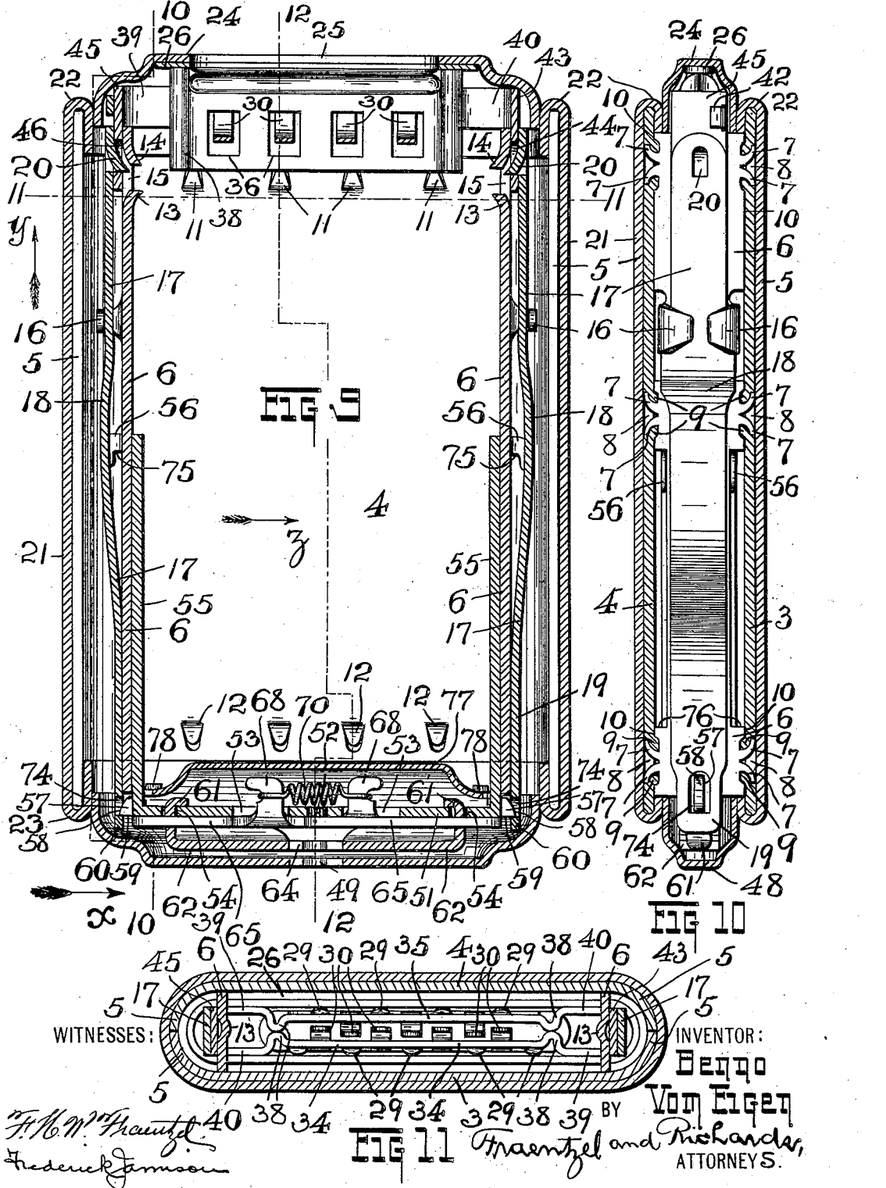
Fig. 9 is an enlarged longitudinal vertical section of the shell or casing, and the various mechanisms arranged therein, said section being taken on line 9—9 in Fig. 2 of the drawings.
Fig. 10 is a transverse sectional representation of the shell or casing, and the various end shells or casings arranged in the open end-portions of the said main shell or casing, said section being taken substantially on line 10—10 in said Fig. 9, looking in the direction of the arrow $x$.
Fig. 11 is a horizontal section taken on line 11—11 in said Fig. 9 looking in the direction of the arrow $y$.
Figures 12, 13, 14, 15, 16, 17, 18:
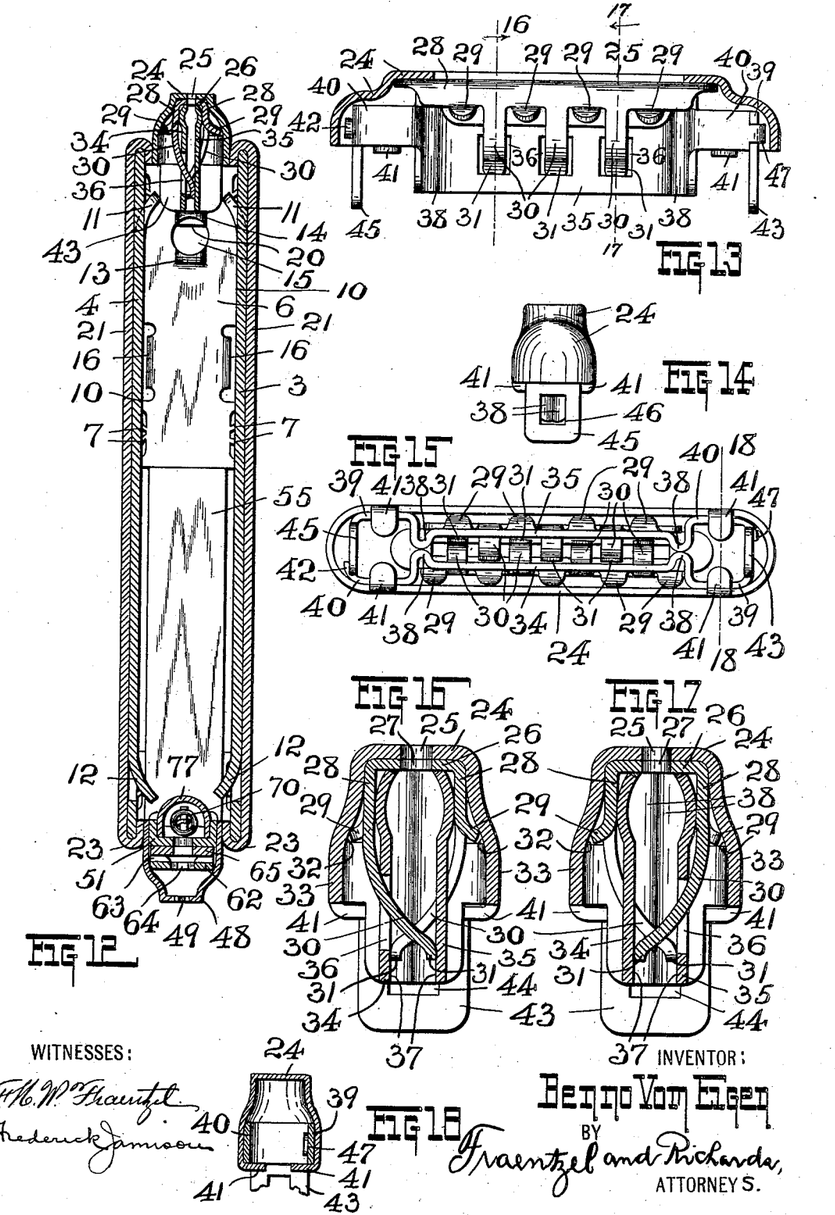
Fig. 12 is a central transverse sectional representation of the various parts, said section being taken on line 12—12 in said Fig. 9 looking in the direction of the arrow $z$.
Fig. 13 is a longitudinal vertical section of the coin-receiving end-casing or shell, and a side-view of the mechanism which is arranged in said end casing or shell.
Fig. 14 is an end view of the same.
Fig. 15 is a bottom view of the said parts shown in said Fig. 13.
Fig. 16 is a transverse sectional representation, on an enlarged scale, said section being taken on line 16—16 in said Fig. 13.
Fig. 17 is a similar section, taken on lines 17—17 in said Fig. 13.
Fig. 18 is a transverse section taken on line 18—18 in said Fig. 15.
Figure 19:
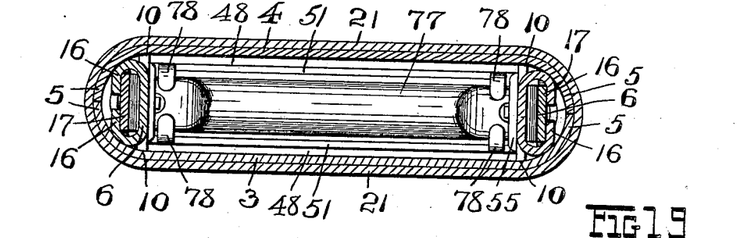
Fig. 19 is a transverse sectional representation taken on line 19—19 in said Fig. 6.
Figure 20:
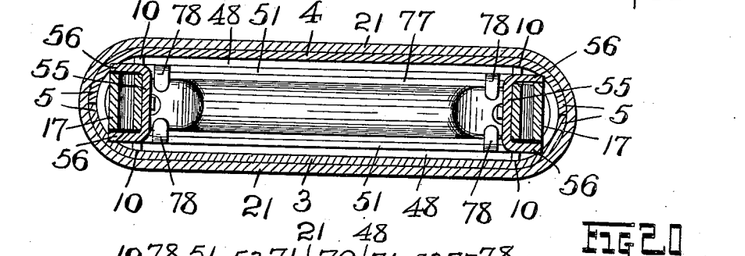
Fig. 20 is a similar section taken on line 20—20 in said Fig. 6.
Figures 21, 22, 23, 24:
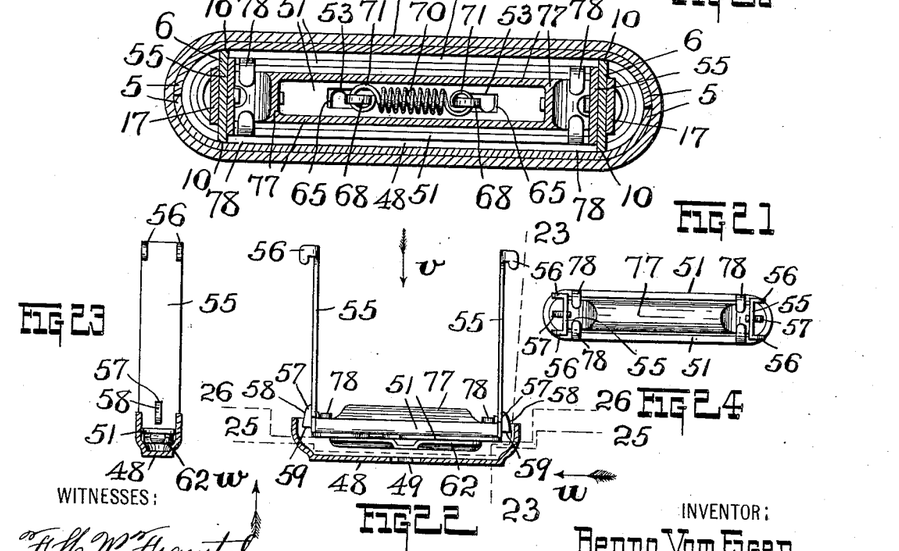
Fig. 21 is a transverse section taken on line 21—21 in said Fig. 6, all of said sections being made on enlarged scales.
Fig. 22 is a longitudinal vertical section of the lock-containing casing or shell and side-view of the lock and parts connected therewith.
Fig. 23 is a transverse sectional representation of the same, said section being taken on line 23—23 in said Fig. 22, looking in the direction of said arrow $u$.
Fig. 24 is a view of the parts represented in said Fig. 22, looking in the direction of the arrow $v$.
Figure 25:
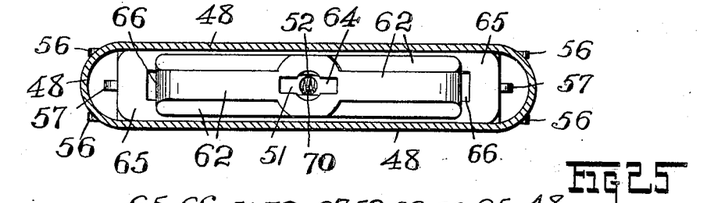
Fig. 25 is a horizontal section taken on line 25—25 in said Fig. 22, looking in the direction of the arrow $w$.
Figure 26:
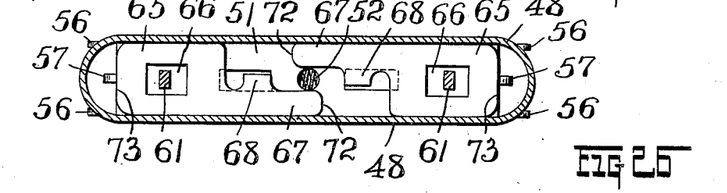
Fig. 26 is a similar sectional representation taken on line 26—26 in said Fig. 22, also looking in the direction of the arrow $w$, said sections being made on enlarged scales.
Figure 27:
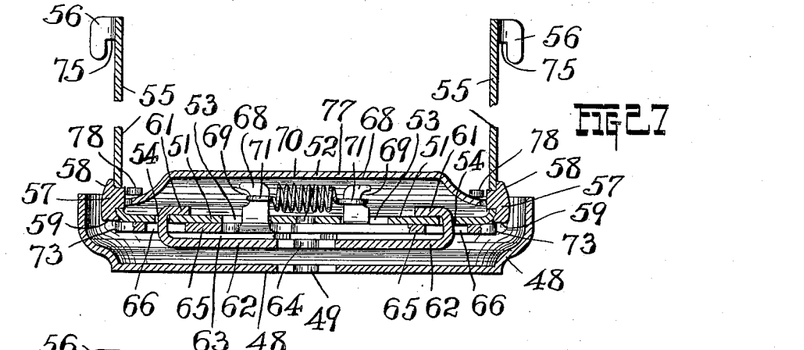
Fig. 27 is a longitudinal vertical section of the lock containing casing and the locking mechanism therein, said section being made on an enlarged scale, and the parts being shown in their normal inoperative positions.
Figure 28:
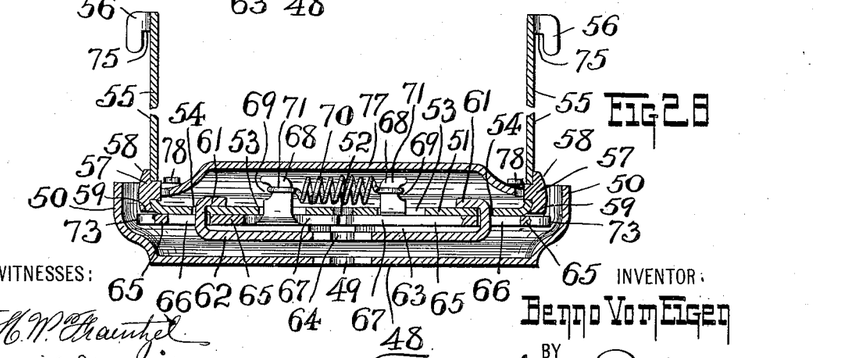
Fig. 28 is a similar sectional representation of the various devices, and parts represented in said Fig. 27, showing the various parts in their key-actuated or operated positions.

Suitable plates or side-pieces 6 are arranged between the two metal shells or sections 3 and 4, each side-piece being arranged with a series of suitably disposed prongs 7, which enter correspondingly disposed holes or openings 8 in the respective shells or sections 3 and 4, said prongs being bent over against suitably holding portions 9 so that each shell or section will have its inner surface-portions resting securely upon the opposite edge-portions 10 of the various side-plates or elements 6, in the manner clearly indicated in Figs. 5 and 10 of the drawings. Near their upper end-portions the two connected metal shells or sections 3 and 4 are provided with a series of inwardly extending prong-shaped members or tongues 11, the same being forced out of the metal shells or sections 3 and 4, and at or near the lower end-portions of the two connected metal shells or sections 3 and 4 are series of other inwardly extending prong-shaped members or tongues 12, substantially as illustrated in Figs. 9 and 12 of the drawings and the purposes of which will be hereinafter more fully set forth. Each side-plate or member 6 is provided near its upper end with the inwardly extending portions 13 and 14, which are forced out of the metal and provide a suitable opening or hole 15. Each side-plate or member 6 is also provided with a pair of retaining or guiding tongues 16 which are suitably curved or bent toward each other substantially as shown and beneath which is arranged a long spring-plate 17, each spring-plate being bent substantially as shown at 18, and having its lower end-portion 19 resting directly upon and in engagement with the lower surface portion of the side-plate 6. At or near the upper end each spring-plate 17 is provided with an inwardly projecting tongue or lug 20, substantially as illustrated in Fig. 9 of the drawings, and the purposes of which will be presently more fully described. An envelop or covering 21 of leather or any other suitable material is arranged about the two connected main shells or sections 3 and 4, with the respective end-portion 22 and 23 of the said envelop or covering 21 fitted around the respective upper and lower end-portions of the connected shells or sections 3 and 4 and extending into the said open ends and being suitably secured in place by means of cement, paste, or similar securing means. Arranged in the upper open end of the said main shells or sections 3 and 4 is a coin-receiving end-casing or shell 24, substantially of the shape and configuration illustrated in the several figures of the drawings, the said end-casing or shell being fitted in the open end-portion of the said connected main sections 3 and 4, substantially in the manner illustrated in Figs. 6, 7, 8, 9, 10 and 12 of the drawings, and the said end casing or shell being provided in its upper surface with a longitudinally extending slot or opening 25 for the purposes of receiving a coin therein. Suitably fitted within and registering with the upper inner portion of the said end shell or casing 24 is a plate or member 26 which is provided with a longitudinally extending slot corresponding to and registering with the slot 25 in the upper surface of the end casing or shell 24. The said plate or member 26 is provided along its longitudinal edge-portions with downwardly extending elements or members 28 from which extend a series of alternately disposed short and outwardly extending spring-tongues or holding members 29 and longitudinally extending spring-tongues or holding members 30, the said spring-tongues or members 30 having their lower end-portions 31 arranged in a crossed manner, substantially as illustrated in Figs. 16 and 17 of the drawings. The purpose of the previously mentioned short and outwardly extending tongues or members 29 is to securely retain or hold the said plate or member in its operative position in the upper portion of the said end-shell or casing 24, by the frictional contact or engagement of the said tongues 29 with the inner surface portions 32 of the sides 33 of said end-shell or casing 24, as will be clearly evident from an inspection of Figs. 15, 16 and 17 of the drawings.

To prevent the undue spreading apart of the oppositely disposed long tongues 30 by the insertion of a knife-blade or other tool into and through the registering slots 25 and 27, I have provided the device with a pair of longitudinally extending guards or plates 34 and 35, the said plates being provided with suitably disposed openings 36 into and through which the lower end-portions of the tongues 30 extend in such a manner that the ends 31 of said tongues will be in an engagement with the inner surface portions 37 directly beneath the said openings 36, in the manner illustrated in Figs. 16 and 17 of the drawings; but, the said lower end-portions of the said tongues 30 being capable of sufficient movements in opposite outward directions to permit the inserted coin to be forced between said tongues 30 so as to be deposited in the interior of the bank. Near their respective ends, the said guards or plates 34 and 35 are made with inwardly extending parts or elements 38 which are brought in contact with each other, substantially in the manner shown in Fig. 15 of the drawings, suitable arms 39 and 40 extending from parts or elements 38 of the respective plates or guards 34 and 35, said arms 39 and 40 being bent in such a manner that their surfaces will be in frictional engagement with the lower inner surface portions of the sides 33 of the end-shell or casing 24, substantially as shown, and whereby the two guards or plates 34 and 35 are forcibly compressed in their operative positions within the said end-shell or casing 24. Lugs or holding tongues 41 are formed upon the lower marginal edge-portions of the sides 33 of the said shell or casing 24, said lugs being bent inwardly and beneath the lower edge-portions of the respective arms 39 and 40, so as to prevent any downward displacement of the said plates or guards when a coin is forced between the crossed end-portions of the tongues 30. The arm 39 at the one end of the plate or guard 34 is made with a small holding tongue or lug 42, and at its other end the arm 39 is provided with a downwardly extending element or member 43 which is provided with an opening 44. In a like manner, the arm 40 of the plate or guard 35 is provided with a short holding tongue or lug 47, and at its opposite end-portion the arm 40 of the plate or guard 35 is made with a downwardly extending member 45, also provided with an opening 46, see Fig. 9 of the drawings. As will be seen more particularly from an inspection of said Figs. 13 to 18 inclusive, the said members 43 and 45 at each end of the connected guards extend at right angles across the space between the sides 33 of the said end shell or casing 24, with the lug or tongue 42 bent in holding engagement with the member or end-piece 45, and the lug or tongue 47 bent in holding engagement with the member or end-piece 43.

Now, having thus constructed the coin-receiving end-shell or casing and the device therein for preventing tampering with the interior of the bank, I have also provided by this means a device for securely and positively arranging the end shell or casing 24 in the open end of the two connected main shells or casings 3 and 4, which is accomplished by the insertion of the two end-members or pieces 43 and 45 between the upper end-portions of the respective side-plates 6 and the spring-plates 17, until the inwardly projecting tongue or lug 20 on each spring-plate is forced into the opening 44 of the plate-like member or end-piece 43 and into the opening 46 of the plate-like member or end-piece 45, the portion 48 on each end-piece or plate-like member serving as a stop or lock to prevent the withdrawal or displacement of the end-shell or casing 24 from its fixed position in the end-opening of the two connected shells or sections 3 and 4, as will be clearly understood, the spring-action of the spring-plates 17 being such that the inwardly projecting tongues or lugs 20 will at all times, extend into the said openings 44 and 46, and also preferably, into the openings or holes 15 formed in the side-plates 6, substantially in the manner clearly illustrated in said Fig. 9 of the drawings.

In the opposite open end-portion of the two connected main shells or sections 3 and 4, is a suitable closure, in the form of a key-actuated locking device or mechanism, this device being capable of being withdrawn from the open end of the main shell or casing when its holding or locking mechanism has been actuated by the key, and whereby the contents, such as the coins in the bank can be removed therefrom; and, after such removal, by returning the closing device once more into the open end of the two connected main shells or sections 3 and 4, automatically closing or locking the said opened end of the bank. This key-actuated locking device and its parts is more particularly illustrated in Figs. 4, 6, 7, 8, 9, 10, and in Figs. 19 to 28 inclusive, and the locking device proper is arranged and contained in a suitable ornamental end-shell or casing 48 which is provided in its upper face with a key-receiving hole or opening 49, the surrounding edge-portions 50 of the shell or casing 48 being adapted to be inserted and movably arranged in the open end of the two connected main shells or sections 3 and 4, substantially as shown and operating in the manner and for the purposes to be presently more fully described.

The reference-character 51 indicate as main plate or body, said plate being provided with a centrally disposed hole 52, a pair of longitudinally extending slots or elongated openings 53 and a pair of other openings or holes 54. At its respective ends, the said main plate or body 51 is provided with a pair of rearwardly extending arms 55, which are slidably arranged upon the inner surfaces of the lower portions of the previously mentioned side-plates 6, and are formed at or near their free end-portions with suitably formed guiding-members or ears 56, which are adapted to be slidably arranged upon the opposite edges of the side-plates 6, so as to properly guide the key-actuated locking device in a reciprocatory manner, back and forth, from the open end-portion of the connected shells or sections 3 and 4; and, furthermore, to properly guide the reciprocatory movements of said arm 55 upon the inner faces of the respective side-plates 6, as and for the purposes to be presently more fully described. Suitably connected with the lower end portions of said arms 55 are outwardly extending projections or holding lugs 57, each lug or projection 57 being formed with a curved edge-portion 58, and each lug or projection, under normal conditions, extending into a suitably disposed hole or opening in the lower portion 19 of each spring-plate 17, said lugs or projections 57 being formed with the straight-edges 59, thus brought in a positive stop or locked engagement with each portion 60 upon the lower end of each spring-plate 17, as will be clearly understood more particularly from an inspection of Fig. 9 of the drawings.

Suitably secured upon the under face of the main plate or body 51, by means of the fastening lugs 61 which are passed through the slots or openings 54 and then bent over upon and against the opposite side of the plate or body 51, is a section or element 62, forming with the main plate or body 51 a space 63, substantially as illustrated. The section or element 62 is also provided with a key-receiving opening or hole 64 which corresponds to and is located vertically above the hole or opening 49 in the end-shell or casing 48, as clearly shown in several figures of the drawings. Movably arranged in the space 63 are a pair of bolts 65, said bolts being substantially of the configuration shown in Fig. 26 of the drawings, and each bolt being provided with an elongated opening 66, through which the fastening lugs 61, hereinabove mentioned, extend as shown, and each bolt being provided with a longitudinally extending finger 67. The two fingers are arranged in the manner shown in said Fig. 26, so as to be located on opposite sides of the key-hole and not interfere with the insertion of the key. Each finger 67 is made with an upwardly extending post or lug 68 which extends through an opening or slot 53 in the main plate or body 51, said posts or lugs 68 being formed in their edges with suitable depressions, as 69, or other retaining means, for the reception and fastening therein of the looped end-portions 71 of a suitable coiled spring 70. The purpose of this spring is to draw the two bolts, under normal conditions, inwardly, so that the bolts will lie in the positions shown in Figs. 9, 26 and 27; but, when a key 2, see Fig. 1, is inserted and turned a quarter-turn to bring the projections of the key respectively against the ends 72 of the fingers 67, then the bolts are moved outwardly and in opposite directions, to the positions shown in Fig. 28 of the drawings. These movements of the bolts force their ends 73 against the lower end-portions 19 of the spring-plates 17, whereby said end-portions 19 will have the holes or openings 74 in said spring-plates removed from the lugs or projections 57, so that said lugs or projections 57 and the parts 60 of each spring-plate are brought into their disengaged relation, as will be clearly evident, and which is shown in a general way in Fig. 7 of the drawings. The key still being left in the lock, the parts can then be pulled from their closing position within the open end of the connected shells or sections 3 and 4, so as to bring the closing device into the positions represented in Figs. 4 and 8 of the drawings, until the edges 75 of the guiding-members or ears 56 of the arms 55 are brought in engagement with suitably disposed stops 76 formed upon the edges of the side-plates 6, thus limiting and arresting the outward movement of the closing device. The contents of the bank can now be removed from the interior of the casing. As soon as the key is turned into its former position for removal from the key-holes, and as soon as it is removed from the lock, the spring 70 at once returns the two bolts inwardly to their normal initial positions. When the closing device is again returned in the direction toward the opening in the end of the back, the curved edge-portions 58 of the lugs or projections 57 will be brought against the inner faces of the lower portions of the spring-plates 17, thus forcing their end-portions 19 outwardly, until the lugs or projections 57 are located directly opposite the openings or holes 74 in said spring-plates 17, and immediately the end-portions 19 of said spring-plates are once more brought in holding engagement with the lugs or projections 57, thus closing the open end of the bank, and at the same time automatically locking the parts against movement, except with the employment of the key for the manipulation of the bolts 65 in the manner hereinabove described.

To prevent the deposited coin or coins coming in contact with the spring 70 and the posts 68, and thereby perhaps prevent the movements of the latter and render the device inoperative, a suitable hood, shell or casing 77 is arranged upon the said main plate 51, substantially in the manner illustrated in the various figures of the drawings, the end-shell or casing 48 being provided with suitably disposed clamping lugs or tongues 78 which are bent over and upon portions of the hood, shell or casing 77, whereby the latter is securely held in place.

The previously mentioned inwardly extending tongues 11 and 12 are for the purposes of preventing the insertion of a thin blade, such as a knife-blade, into either end of the bank, between the inwardly turned leather-portions and the sides of the end-shells or casings 24 and 48, thereby preventing or at least minimizing the possibility of prying apart the ends of the bank. At the same time, the said tongues 11 and 12 serve another purpose, in that they prevent the coins from coming in contact with the edges of the turned-in portions of the covering 21, which edges might otherwise become loosened by the constant moving of the coins against them.

The manipulation and the workings of the several hereinabove described devices and mechanism will be clearly understood from the foregoing description, and need not, therefore, be further dwelt upon at this time; and, it will be seen, that a very simple and effective arrangement and construction of the devices and parts has been produced for the purposes of providing a bank intended to be carried in the pocket, and which can be opened only by the properly authorized person who is provided with a key.

I am aware, that various changes may be made in the arrangements and combinations of the devices and their parts, as well as in the details of the construction of the same, without departing from the scope of the present invention, as defined in the appended claims. Hence, I do not limit my invention to the exact arrangements and combinations of the devices and the parts thereof, as described in the foregoing specification and as illustrated in the accompanying drawings, nor do I confine myself to the exact details of the construction of any of the said parts.

I claim:—

1. A coin-repository comprising a chambered casing formed with open ends, a coin-receiving end-shell forming a closure to one of said open ends, an end-shell movably arranged in the other open end of said casing, said end shell being adapted to be withdrawn from said casing and means for locking said end-shell in its closed relation in the end of the casing, substantially as and for the purpose set forth.

2. A coin-repository comprising a chambered casing formed with open-ends, a coin-receiving end-shell forming a closure to one of said open-ends, an end-shell movably arranged in the other open end of said casing, a connecting device between the said two end-shells, arranged for securing the coin-receiving end-shell in a fixed position in the one open end of the casing, and for permitting the sliding movement of the other end-shell in the other open end of said casing, substantially as and for the purposes set forth.

3. A coin-repository comprising a chambered casing formed with open-ends, a coin-receiving end-shell forming a closure to one of said open-ends, an end-shell movably arranged in the other open end of said casing, a connecting device between the said two end-shells, arranged for securing the coin-receiving end-shell in a fixed position in the one open end of the casing, and for permitting a sliding movement of the other end-shell in the other open end of said casing, and means connected with said last-mentioned end-shell for locking said end-shell in its closed relation in said open end of the casing, substantially as and for the purposes set forth.

4. A coin-repository comprising a chambered casing formed with open ends, longitudinally extending side-plates within said casing, a coin-receiving end-shell forming a closure to one of said open ends, means connected with said end-shell for permanently securing the shell in a fixed relation to the one end-portion of each side-plate, and an end-shell movably arranged in the other open end of the casing, substantially as and for the purposes set forth.

5. A coin-repository comprising a chambered casing formed with open ends, longitudinally extending side-plates, within said casing, a coin-receiving end-shell forming a closure to one of said open ends, means connected with said end-shell for permanently securing the shell in a fixed relation to the one end-portion of each side-plate, and an end-shell in the other open end of the casing, and means extending from said end-shell and slidably connected with each side-plate for permitting a sliding movement of said end-shell in the open end of the casing, substantially as and for the purposes set forth.

6. A coin-repository comprising a chambered casing formed with open ends, longitudinally extending side-plates, within said casing, a coin-receiving end-shell forming a closure to one of said open ends, means connected with said end-shell for permanently securing the shell in a fixed relation to the one end-portion of each side-plate, and an end-shell in the other open end of the casing, and means extending from said end-shell and slidably connected with each side-plate for permitting a sliding movement of said end-shell in the open end of the casing, and means connected with said last-mentioned end-shell for locking said end-shell in its closed relation in said open end of the casing, substantially as and for the purposes set forth.

7. A coin-repository comprising a chambered casing formed with open ends, longitudinally extending side-plates within said casing, a coin-receiving end-shell forming a closure to one of said open ends, means connected with said end-shell for permanently securing the shell in a fixed relation to the one end-portion of each side-plate, an end-shell in the other open end of the casing, arms connected with said end-shell extending into said casing, and a guide upon each arm, each guide being slidably connected with a side-plate, substantially as and for the purposes set forth.

8. A coin-repository comprising a chambered casing formed with open ends, longitudinally extending side-plates within said casing, a coin-receiving end-shell forming a closure to one of said open ends, means connected with said end-shell for permanently securing the shell in a fixed relation to the one end-portion of each side-plate, an end-shell in the other open end of the casing, arms connected with said end-shell extending into said casing, and a guide upon each arm, each guide being slidably connected with a side-plate, and means connected with said last-mentioned end-shell for locking said end-shell in its closed relation in said open end of the casing, substantially as and for the purposes set forth.

9. A coin-repository comprising a chambered casing formed with open ends, longitudinally extending side-plates within said casing, a coin-receiving end-shell forming a closure to one of said open ends, means connected with said end-shell for permanently securing the shell in a fixed relation to the one end-portion of each side-plate, an end-shell in the other open end of the casing, arms connected with said end-shell extending into said casing, and a guide upon each arm, each guide being slidably connected with a side-plate, and a key-operated locking-mechanism connected with said end-shell for locking said end-shell in its closed relation in said open end of the casing, substantially as and for the purposes set forth.

10. A coin-repository comprising a chambered casing formed with open ends, longitudinally extending side-plates within said casing, a spring-plate mounted upon each side-plate, each spring-plate having a receiving opening in its lower end-portion, a coin-receiving end-shell forming a closure to one of said open ends, means connected with said end-shell for permanently securing the shell in a fixed relation to the end-portions of each side-plate and the spring-plate mounted thereon, an end-shell in the other open end of the casing, means extending from said end-shell and slidably connected with each side-plate for permitting a sliding movement of said end-shell in the open end of the casing, and a holding means connected with said last-mentioned end-shell adapted to be brought in holding engagement with the receiving opening of said spring-plates, substantially as and for the purposes set forth.

11. A coin-repository comprising a chambered casing formed with open ends, longitudinally extending side-plates within said casing, a spring-plate mounted upon each side-plate, each spring-plate having a receiving opening in its lower end-portion, a coin-receiving end-shell forming a closure to one of said open ends, means connected with said end-shell for permanently securing the shell in a fixed relation to the end-portions of each side-plate and the spring-plate mounted thereon, an end-shell in the other open end of the casing, means extending from said end-shell and slidably connected with each side-plate for permitting a sliding movement of said end-shell in the open end of the casing, and a holding means connected with said last-mentioned end-shell adapted to be brought in holding engagement with the receiving opening of said spring-plates, and means connected with said end-shell adapted to be brought in engagement with portions of said spring-plates for forcing said holding means from within the receiving openings of said spring-plates, substantially as and for the purposes set forth.

12. A coin-repository comprising a chambered casing formed with open ends, longitudinally extending side-plates within said casing, a spring-plate mounted upon each side-plate, each spring-plate having a receiving opening in its lower end-portion, a coin-receiving end-shell forming a closure to one of said open ends, means connected with said end-shell for permanently securing the shell in a fixed relation to the end-portions of each side-plate and the spring-plate mounted thereon, an end-shell in the other open end of the casing, arms connected with said end-shell extending into said casing, a guide upon each arm, each guide being slidably connected with a side-plate, and a holding means connected with said last-mentioned end-shell adapted to be brought in holding engagement with the receiving openings of said spring-plates, substantially as and for the purposes set forth.

13. A coin-repository comprising a chambered casing formed with open ends, longitudinally extending side-plates within said casing, a spring-plate mounted upon each side-plate, each spring-plate having a receiving opening in its lower end-portion, a coin receiving end-shell forming a closure to one of said open ends, means connected with said end-shell for permanently securing the shell in a fixed relation to the end-portions of each side-plate and the spring-plate mounted thereon, an end-shell in the other open end of the casing, arms connected with said end-shell extending into said casing, a guide upon each arm, each guide being slidably connected with a side-plate, and a holding means connected with said last-mentioned end shell adapted to be brought in holding engagement with the receiving openings of said spring-plates, and means connected with said end-shell adapted to be brought in engagement with portions of said spring-plates for forcing said holding means from within the receiving openings of said spring-plates, substantially as and for the purposes set forth.

14. A coin-repository comprising a chambered casing formed with open ends, longitudinally extending side-plates within said casing, a spring-plate mounted upon each side-plate, each spring-plate having a receiving opening in its lower end-portion, a coin-receiving end-shell forming a closure to one of said open ends, means connected with said end-shell for permanently securing the shell in a fixed relation to the end-portions of each side-plate and the spring-plate mounted thereon, an end-shell in the other open end of the casing, arms connected with said end-shell extending into said casing, a guide upon each arm, each guide being slidably connected with a side-plate, and a holding means connected with said last-mentioned end-shell adapted to be brought in holding engagement with the receiving openings of said spring-plates, and oppositely moving key-operated bolts in said end-shell adapted to be brought in engagement with portions of said spring-plates for forcing said holding means from within the receiving openings of said spring-plates, substantially as and for the purposes set forth.

15. A coin-repository comprising a chambered casing formed with open ends, longitudinally extending side-plates within said casing, a spring-plate mounted upon each side-plate, each spring-plate having a receiving opening in its lower end-portion, a coin-receiving end-shell forming a closure to one of said open ends, means connected with said end-shell for permanently securing the shell in a fixed relation to the end-portions of each side-plate and the spring-plate mounted thereon, an end-shell in the other open end of the casing, arms connected with said end-shell extending into said casing, a guide upon each arm, each guide being slidably connected with a side-plate, and a holding means connected with said last-mentioned end-shell adapted to be brought in holding engagement with the receiving openings of said spring-plates, and oppositely moving key-operated bolts in said end-shell adapted to be brought in engagement with portions of said spring-plates for forcing said holding means from within the receiving openings of said spring-plates, an upwardly extending post upon each bolt, and a spring arranged between and connected with said posts for returning the bolts to their normal initial positions, substantially as and for the purposes set forth.

16. A coin-repository comprising a chambered casing formed with open ends, longitudinally extending side-plates within said casing, a coin-receiving end-shell forming a closure to one of said open ends, a spring-plate mounted upon each side-plate, an inwardly extending retaining lug upon the upper end-portion of each spring-plate, a pair of downwardly extending plate-like members connected with said coin-receiving end-shell, each plate-like member being provided with an opening for the reception of a retaining lug of the spring-plates to retain the coin-receiving end-shell in a fixed position in the open end of the casing, and an end-shell movably arranged in the other open end of the casing, substantially as and for the purposes set forth.

17. A coin-repository comprising a chambered casing formed with open ends, longitudinally extending side-plates within said casing, a coin-receiving end-shell forming a closure to one of said open ends, a spring-plate mounted upon each side-plate, an inwardly extending retaining lug upon the upper end-portion of each spring-plate, a pair of downwardly extending plate-like members connected with said coin-receiving end-shell, each plate-like member being provided with an opening for the reception of a retaining lug of the spring-plates to retain the coin-receiving end-shell in a fixed position in the open end of the casing, an end-shell in the other open end of the casing, and means extending from said end-shell and slidably connected with each side-plate for permitting a sliding movement of said end-shell in the open end of the casing, substantially as and for the purposes set forth.

18. A coin-repository comprising a chambered casing formed with open ends, longitudinally extending side-plates within said casing, a coin-receiving end-shell forming a closure to one of said open ends, a spring-plate mounted upon each side-plate, an inwardly extending retaining lug upon the upper end-portion of each spring-plate, a pair of downwardly extending plate-like members connected with said coin-receiving end-shell, each plate-like member being provided with an opening for the reception of a retaining lug of the spring-plates to retain the coin-receiving end-shell in a fixed position in the open end of the casing, and an end shell movably arranged in the other open end of the casing, arms connected with said end shell extending into said casing, and a guide upon each arm, each guide being slidably connected with a side-plate, substantially as and for the purposes set forth.

19. A coin-repository comprising a chambered casing formed with open ends, longitudinally extending side-plates within said casing, a coin-receiving end-shell forming a closure to one of said open ends, a spring-plate mounted upon each side-plate, an inwardly extending retaining lug upon the upper end-portion of each spring-plate, a pair of downwardly extending plate-like members connected with said coin-receiving end-shell, each plate-like member being provided with an opening for the reception of a retaining lug of the spring-plates to retain the coin-receiving end-shell in a fixed position in the open end of the casing, each spring-plate being provided also at its lower end-portion with a receiving opening, an end-shell in the other open end of the casing, means extending from said end-shell and slidably connected with each side-plate for permitting a sliding movement of said end-shell in the open end of the casing, and a holding means connected with said last-mentioned end-shell adapted to be brought in holding engagement with the receiving openings of said spring-plates, and means connected with said end-shell adapted to be brought in engagement with portions of said spring-plates for forcing said holding means from within the receiving openings of said spring-plates, substantially as and for the purposes set forth.

20. A coin-repository comprising a chambered casing formed with open ends, longitudinally extending side-plates within said casing, a coin-receiving end-shell forming a closure to one of said open ends, a spring-plate mounted upon each side-plate, an inwardly extending retaining lug upon the upper end-portion of each spring-plate, a pair of downwardly extending plate-like members connected with said coin-receiving end-shell, each plate-like member being provided with an opening for the reception of a retaining lug of the spring-plates to retain the coin-receiving end-shell in a fixed position in the open end of the casing, each spring-plate being provided also at its lower end-portion with a receiving opening, an end-shell in the other open end of the casing, arms connected with said end-shell extending into said casing, a guide upon each arm, each guide being slidably connected with a side-plate, and a holding means connected with said last-mentioned end-shell adapted to be brought in holding engagement with the receiving openings of said spring-plates, substantially as and for the purposes set forth.

21. A coin-repository comprising a chambered shell consisting of a pair of shells or sections having abutting edges, said shells or sections being made with oppositely located lug-receiving perforations, a pair of longitudinally extending side-plates, fastening lugs extending from the edges of said side-plates, said lugs extending into said perforations and being bent-over in holding engagement with said side-plates, all arranged to produce a chambered casing having open ends, a coin-receiving end-shell forming a closure to one of said openings, an end-shell movably arranged in the other open end of said casing, and a key-operated locking-mechanism connected with said end-shell for locking said shell in its closed relation in said open end of the casing, substantially as and for the purposes set forth.

22. A coin-repository comprising a chambered shell consisting of a pair of shells or sections having abutting edges, said shells or sections being made with oppositely located lug-receiving perforations, a pair of longitudinally extending side-plates, fastening lugs extending from the edges of said side-plates, said lugs extending into said perforations and being bent-over in holding engagement with said side-plates, all arranged to produce a chambered casing having open ends, a pair of retaining lugs extending outwardly from and over each side-plate, a spring-plate mounted upon each side-plate and held in position by means of said retaining lugs, each spring-plate having a receiving opening in its lower end-portion, a coin-receiving end-shell forming a closure to one of said open ends, means connected with said end-shell for permanently securing the shell in a fixed relation to the end-portions of each side-plate and the spring-plate mounted thereon, an end-shell in the other open end of the casing, means extending from said end-shell and slidably connected with each side-plate for permitting a sliding movement of said end-shell in the open end of the casing, and a holding means connected with said last-mentioned end-shell adapted to be brought in holding engagement with the receiving openings of said spring-plates, substantially as and for the purposes set forth.

23. A coin-repository comprising a chambered casing provided with open ends, a coin-receiving end-shell forming a closure to one of said ends, an end-shell movably arranged in the other open end of said casing, and a series of prongs connected with and extending from the opposite sides of said chambered casing, substantially as and for the purposes set forth.

24. A coin-repository comprising a chambered casing provided with open ends, a coin-receiving end-shell forming a closure to one of said ends, an end-shell movably arranged in the other open end of said casing, a series of prongs connected with and extending from the opposite sides of the chambered shell, said prongs being located near the coin-receiving end-casing, and a second series of prongs connected with and extending from the opposite sides of the chambered casing, said second series of prongs being located near the said other end-shell, substantially as and for the purposes set forth.

In testimony, that I claim the invention set forth above I have hereunto set my hand this 27th day of March, 1907.

BENNO VOM EIGEN.

Witnesses:
FREDK. C. FRAENTZEL,
ANNA H. ALTER.